No. 869,574. PATENTED OCT. 29, 1907.
W. B. HUTHER.
SAW.
APPLICATION FILED SEPT. 10, 1906.
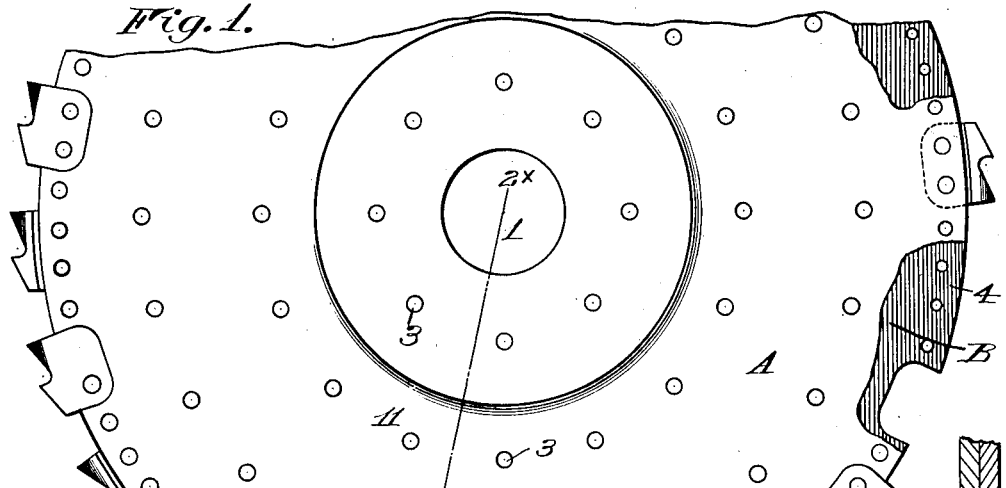
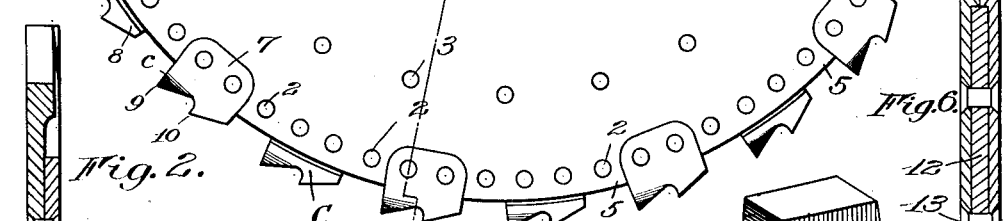
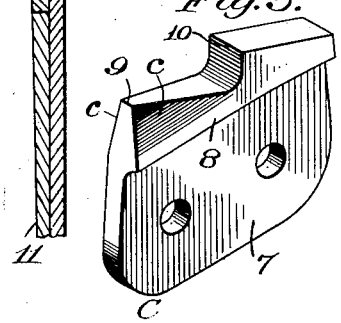
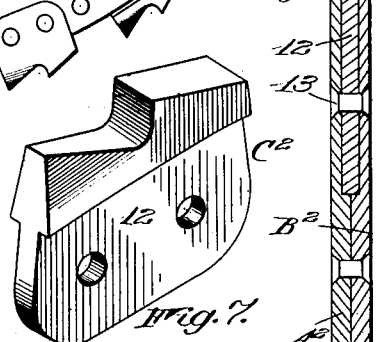
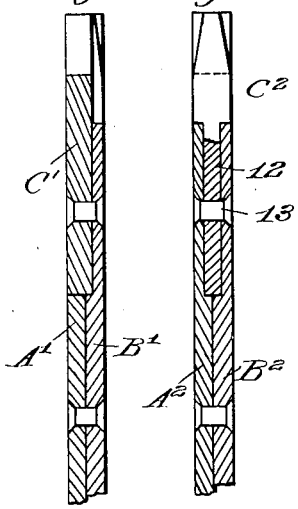
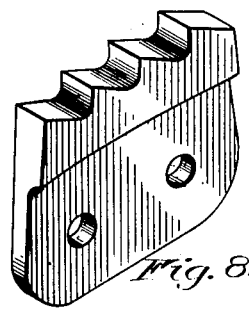
Witnesses
Walter B. Payne
Florence E. Franck
Inventor
Warren B. Huther
By Church & Rich
his Attorneys

UNITED STATES PATENT OFFICE.

WARREN B. HUTHER, OF ROCHESTER, NEW YORK, ASSIGNOR TO HUTHER BROTHER'S SAW MANUFACTURING COMPANY, OF ROCHESTER, NEW YORK, A CORPORATION OF NEW YORK.

SAW.

No. 869,574.   Specification of Letters Patent.   Patented Oct. 29, 1907.

Application filed September 10, 1906. Serial No. 333,927.

*To all whom it may concern:*

Be it known that I, WARREN B. HUTHER, of Rochester, in the county of Monroe and State of New York, have invented certain new and useful Improvements in Saws; and I do hereby declare the following to be a full, clear, and exact description of the same, reference being had to the accompanying drawings, forming a part of this specification, and to the reference numerals marked thereon.

My present invention has for its object to provide a saw which is particularly adapted for cutting metal having detachable or inserted teeth whereby they may be tempered to the required degree of hardness and secured to the saw body and when worn, may be sharpened or replaced without the necessity of affecting the temper of the saw body after the latter has once passed through the various operations of forming, straightening and grinding.

My invention has for its further object to produce a saw of this character which may be easily and cheaply constructed of various diameters and the parts thereof being so arranged that the teeth will readily clear themselves during the cutting operation, and when cutting stock of considerable thickness will not cause the saw to bind.

To these and other ends the invention consists in certain improvements and combinations of parts all as will be hereinafter more fully explained, the novel features being pointed out in the claims at the end of the specification.

In the drawings: Figure 1 is a side elevation of a portion of a saw constructed in accordance with my invention. Fig. 2 is an enlarged sectional view taken on the line $2^\times$ $2^\times$ of Fig. 1. Fig. 3 is a perspective view of one of the cutters removed. Figs. 4 and 5 are views illustrating a modified arrangement of the parts, and Fig. 6 is a circumferential view. Fig. 7 is a perspective view of the cutter shown in Fig. 5, and Fig. 8 is a view similar to Fig. 3, showing a cutter provided with teeth of a different character.

Similar reference numerals in the several figures indicate similar parts.

In illustrating my invention I have shown it as embodied in a saw comprising two circular plates or disks A and B each provided with a central aperture 1 adapted to receive the usual spindle of a saw arbor. The plates are arranged side by side and are secured together near their peripheries by rivets 2, and at other points by rivets 3, and detachably secured to them are the inserted cutters C provided with teeth, as shown. Each plate is provided with notches or recesses adapted to receive the cutters. These notches or recesses are arranged equidistantly around the circumference of the respective plates and are preferably formed by punching out portions of the edges of the plates leaving thereon intervening portions or tongues 4 which, measuring between the proximate edges of adjacent recesses, are preferably of a greater length than the length of the cutters so that when the latter are arranged centrally thereon, spaces 5 will be provided between the rear edges of each cutter and the forward edge of a succeeding cutter to provide a clearing space for chips and shavings.

The saw plates when secured together are arranged with their respective notches or recesses alternating in a direction around the periphery so that the recesses in one of them lie centrally on the face of the corresponding tongues on the other plate. Consequently the ends of the tongues on one plate overlap the ends of those on the other plate, a greater or less distance, permitting the rivets 2 to be passed through the two plates and the latter to be secured near their outer edges between the cutters C.

The recesses or notches may be given any desired outline, but in practice it has been found preferable to taper their edges slightly so that their upper ends converge, thus permitting the cutters to be made with broad bases and tapering ends and in effect dovetailing them into the plates, whereby they are securely held against the twisting strain imparted to them during a cutting operation. The cutters are each further attached to the plates by securing devices such as rivets 6 which pass through the cutters, arranged on one plate, and secure them to the corresponding tongues of the other plate, as shown particulary in Fig. 2.

The base portions 7 of the cutters C are made equal to the thickness of their supporting plates and their outwardly projecting ends or heads 8 are extended laterally at one side, as shown in Figs. 2 and 3 so that their inner edges overhang the periphery of the other plate. These heads are each provided with two teeth, as shown in Fig. 3, although a greater number of teeth of different size and shape may be employed if better adapted to work of a peculiar character. The form of teeth which I prefer to use in practice for cutting hard metal, such as steel, are those shown in Fig. 3 in which each cutter is illustrated as provided at its forward edge with a cutting tooth having a narrow edge 9 and a relatively wider clearing tooth having a cutting edge 10 which is the full width of the saw and serves to clear out the kerf. The edge 9 of the forward tooth is made about one-half the width of the wider tooth and is disposed centrally on the cutter by beveling the opposite sides thereof, as indicated by c. By employing alternate teeth of different widths I am enabled to provide a saw which is capable of cutting rapidly with a minimum amount of power. In order to facilitate the operation of the saw and prevent it from binding when making deep cuts, I bevel the outer sides of the cutters and plates slightly and carry the bevel well in toward the center of the saw, as indicated by 11 in Fig. 2.

In Fig. 4 I have shown a modified form of the invention in which the cutters C' are made greater in thickness than their supporting plates. In such a saw the cutters are arranged with their outer faces in the planes of the outer faces of the plates A'—B', their laterally projecting inner faces being received in shallow depressions provided in the inner faces of the tongues of each plate.

If desired, the cutters may be located between the plates, as shown in Fig. 5, in which event the cutters C² are provided with a central web 12 which is received in shallow recesses formed in the inner faces of the two plates A²—B² and secured to each of them by rivets 13.

A saw constructed in accordance with my invention is particularly adapted for cutting metal, although equally capable of cutting other material, as the use of two plates enables the body to be made of stock of the required stiffness which is capable of being easily manipulated, and by inserting the teeth or cutters after the latter have been tempered the liability of warping or twisting the body of the saw as frequently happens during such operations, is avoided. By using two plates the notches or recesses therein may be readily formed by a punching or pressing operation, which being performed upon relatively light or thin stock will not cause it to be thrown out of true to such an extent that a considerable amount of labor is required to subsequently straighten it.

I claim as my invention:

1. A saw comprising two plates arranged side by side and provided with transversely-extending notches arranged alternately in the two plates, rivets passing through the rims of the plates between the notches, teeth located in the latter and rivets securing them to the plates.

2. A saw comprising two plates arranged side by side and provided with transversely extending notches arranged alternately in the two plates, each plate having depressions registering with the notches in the other plate, teeth seated in said notches and depressions and fastening devices securing them to the plates.

WARREN B. HUTHER.

Witnesses:
G. WILLARD RICH,
FLORENCE E. FRANCK.